United States Patent [19]

Haider et al.

[11] Patent Number: 5,277,981
[45] Date of Patent: Jan. 11, 1994

[54] THERMO-OXIDATIVELY STABILIZED POLYBENZIMIDAZOLE-CONTAINING ARTICLES

[75] Inventors: M. Ishaq Haider, Bernardsville; Edward C. Chenevey, North Plainfield, both of N.J.

[73] Assignee: Hoechst Celanese Corp., Somerville, N.J.

[21] Appl. No.: 890,752

[22] Filed: May 28, 1992

[51] Int. Cl.⁵ .............................................. B32B 9/00
[52] U.S. Cl. .................................. 428/408; 264/29.1; 423/447.4; 427/399
[58] Field of Search ............... 423/447.4, 447.5, 447.6, 423/447.7, 447.8; 427/399; 428/408; 264/29.1

[56] References Cited

U.S. PATENT DOCUMENTS

| | | | |
|---|---|---|---|
| 3,449,077 | 6/1969 | Stuetz | 23/209.1 |
| 3,886,251 | 5/1975 | Sekiguchi et al. | 264/210.8 |
| 3,903,248 | 9/1975 | Kalnin et al. | 423/447.4 |

Primary Examiner—Michael Lusignan
Attorney, Agent, or Firm—Joseph M. Mazzarese

[57] ABSTRACT

A process for enhancing the thermo-oxidation stability of a polybenzimidazole-containing article wherein the article contains from about 5 to about 100 weight percent of polybenzimidazole and from about 0 to about 95 weight percent of a thermoplastic polymer, by the steps of providing a phosphoric acid solution of about 2.0 to about 10.0 weight percent of acid; contacting the polybenzimidazole-containing article with the acid solution for sufficient time to produce an acid-treated article; drying the acid-treated article at a low temperature to remove excess acid; and heat treating the dried article at a temperature ranging from about 400° to about 500° C. in an inert atmosphere to form a phosphate barrier layer on the surface of the article, wherein the article retains at least about 50 percent of its weight after isothermal aging at about 600° F. for a period of at least about 300 hours.

15 Claims, 4 Drawing Sheets

THERMO-OXIDATIVELY STABILIZED POLYBENZIMIDAZOLE-CONTAINING ARTICLES

LICENSE RIGHTS

The U.S. Government has a paid-up license in this invention and the right in limited circumstances to require the patent owner to license others on reasonable terms as provided for by the terms of Contract No. F 49620-88C-0014 awarded by the Department of Defense.

FIELD OF INVENTION

The present invention relates to a process for producing thermally resistant, oxidatively stable polybenzimidazole-containing articles useful for high temperature applications.

BACKGROUND ART

Aromatic polybenzimidazoles (PBI) are characterized by exceptional chemical and short term oxidative stability, excellent thermal and solvent resistance with excellent mechanical properties. A general deficiency, however, is that these polymers have high moisture take-up and tend to be intractable, i.e., not readily soluble or melt processable at moderate temperatures and pressures, wherein fabricating into films, fibers and shaped objects is difficult in many cases. Aromatic polyimides and polyetherimides are thermoplastic polymers which are characterized by good long term thermo-oxidative stability, melt processability, mechanical properties, electric properties and low moisture take-up.

To enhance the processability, reduce cost and moisture takeup of PBI, it is often desirable to blend a thermoplastic polymer with PBI when the ultimate objective is an engineering plastic. While the addition of a thermoplastic polymer will reduce moisture takeup and enhance melt processability of PBI, an excessive amount will often lower thermal resistance and other high temperature properties of the blend resulting in reduced engineering plastic properties.

SUMMARY OF THE INVENTION

The present invention is directed to a process for preparing thermally resistant, oxidatively stable polybenzimidazole-containing articles ranging in composition from about 5 to about 100 weight percent of polybenzimidazole and from about 0 to about 95 weight percent of a thermoplastic polymer, based on the total weight of the article, by the steps of:
a) providing a phosphoric acid solution ranging from about 2.0 to about 10.0 weight percent of acid;
b) contacting a polybenzimidazole-containing article with the solution for sufficient time to produce an acid-treated article;
c) drying the acid-treated article at a low temperature to remove excess acid; and
d) heat treating the dried article at a temperature ranging from about 400° to about 500° C. in an inert atmosphere for sufficient time to form a phosphate barrier layer on the surface of the article,
wherein the article retains at least about 50 percent of its weight after isothermal aging in air at about 600° F. for a period of at least about 300 hours.

BRIEF DESCRIPTION OF THE DRAWINGS

While the specification concludes with claims particularly pointing out and distinctly claiming the present invention, the present invention will be better understood from the following description and figures in which:

DETAILED DESCRIPTION OF THE INVENTION

Figure 1:
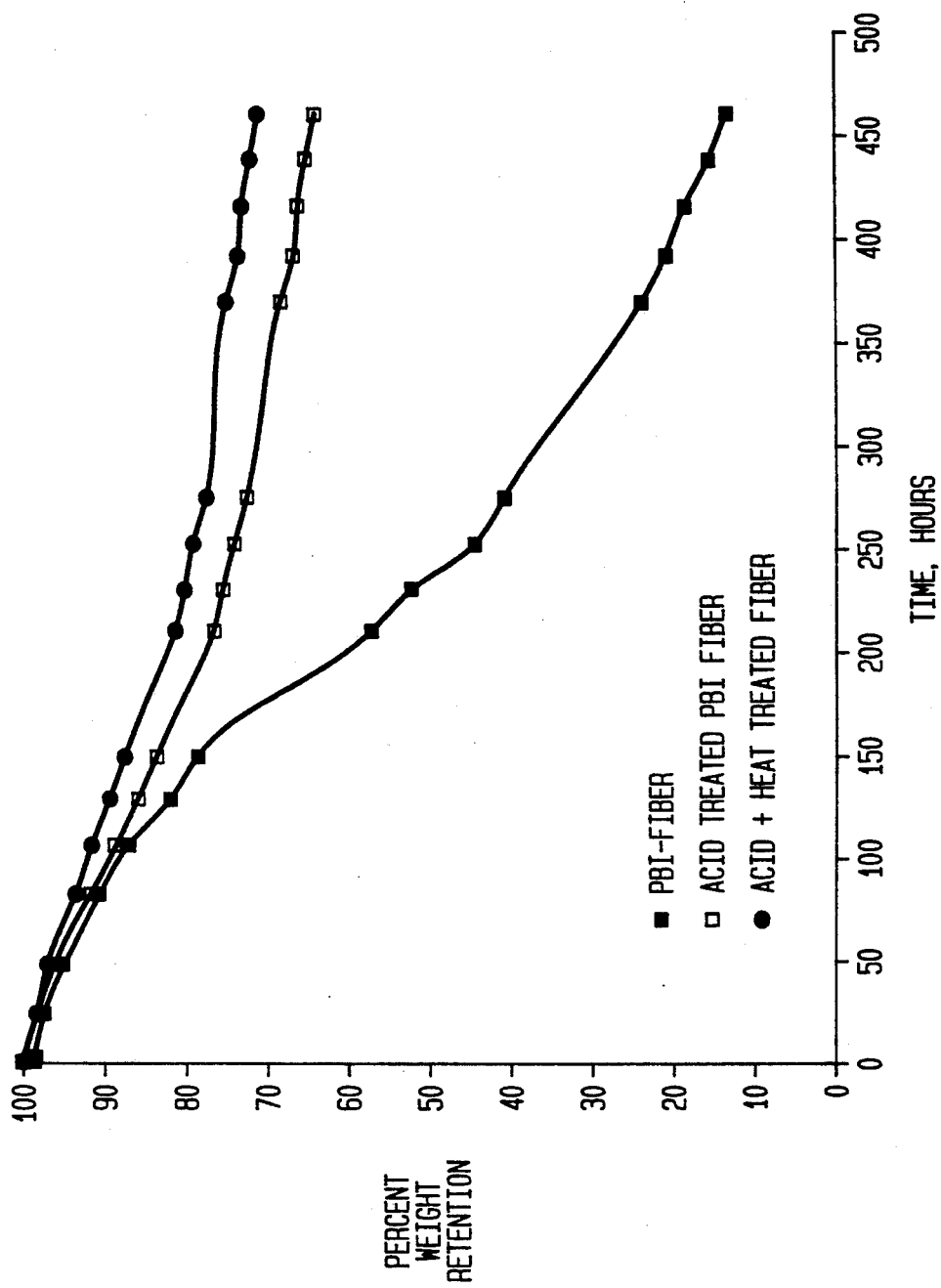
FIG. 1 is a plot of the thermo-oxidative stability at 600° F. of polybenzimidazole fiber treated according to the process of the invention.

Aromatic polybenzimidazoles (PBI) are non-melt processable, polymeric compositions which are difficult to melt process and exhibit excellent short term thermooxidative stability at high temperatures. Typical polymers of this class and their preparation are more fully described in U.S. Pat. Nos. 2,895,946 and Re. 26,065, herein incorporated by reference in their entirety. PBI contains recurring units of the general Formula I and II wherein:

Formula I is:

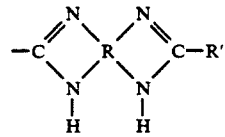

wherein R is a tetravalent aromatic nucleus, preferably symmetrically substituted, with the nitrogen atoms forming the benzimidazole rings being paired upon adjacent carbon atoms, i.e., ortho carbon atoms of aromatic nucleus, and R' is selected from the group consisting of (1) an aromatic ring, (2) an alkylene group, and (3) a heterocyclic ring selected from the group consisting of (a) pyridine, (b) pyrazine, (c) furan, (d) quinoline, (e) thiophene, and (f) pyran; and Formula II is:

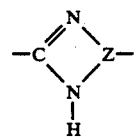

wherein Z is an aromatic nucleus having the nitrogen atoms forming the benzimidazole ring paired upon adjacent carbon atoms of the aromatic nucleus.

The preferred PBI for use in the present invention is poly-2,2'-(m-phenylene)-5,5'-bibenzimidazole, the recurring unit of which is:

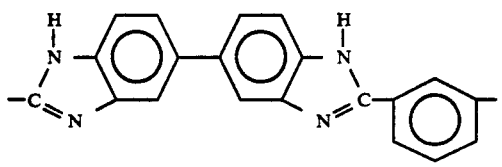

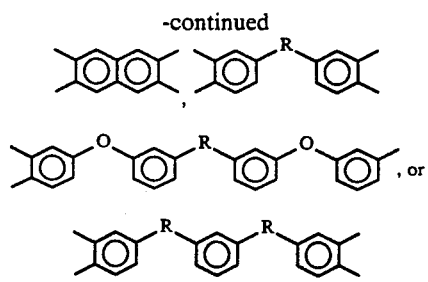

wherein Ar² represents a divalent aromatic moiety having the structure:

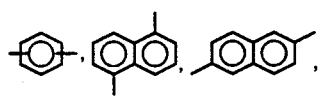

Representative techniques for preparing PBI are disclosed in U.S. Pat. Nos. 3,509,108; 3,549,603; and 3,551,389, which are assigned to the assignee of the present invention, and are herein incorporated by reference in their entirety.

To control molecular weight, the PBI may be end-capped with an end-capping agent, i.e., phenylbenzoate. The preferred end-capped PBI (ecPBI) has the formula:

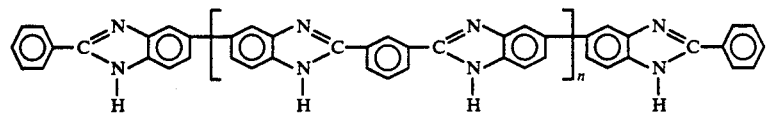

wherein n is an integer ranging from about 18 to about 88.

PBI is readily soluble in highly polar solvents such as N,N'-dimethylacetamide, N,N'-dimethylformamide, dimethylsulfoxide, and N-methyl-2-pyrrolidone, formic acid, sulfuric acid, polyphosphoric acid, and methanesulfonic acid. Particularly, the preferred solvent is N,N'-dimethylacetamide (DMAc).

The thermoplastic polymers useful in the present invention are those which exhibit good long term thermooxidative stability, tractability at moderate temperatures and solubility in polar solvents. While any thermoplastic polymers of this class are suitable for the invention, preferred thermoplastic polymers are polyimides and polyetherimides.

The polyimides (PI) useful in the PBI-containing articles of the invention generally exhibit tractability in their fully imidized form and solublility in chlorinated hydrocarbons, N,N'-dimethylacetamide and meta-cresol. These polyimides contain recurring units of the general formula:

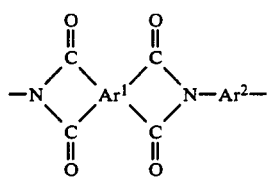

wherein Ar¹ represents a tetravalent aromatic moiety having the structure:

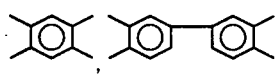

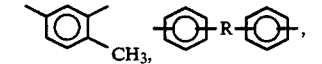

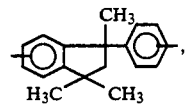

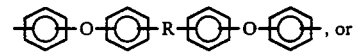

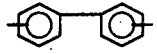

and wherein R is $$-O-, -S-, -(CH_2)_x-, -(CF_2)_x-,$$

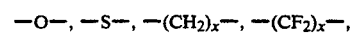

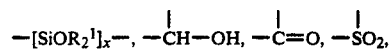

or mixtures thereof, and wherein $R^1$ is $-CH_3$, $-C_6H_5$, $-C_6H_4-CH_3$ or mixtures thereof, and x is an integer from 1 to 6.

A preferred polyimide of the invention is a hexafluoro-containing polyimide, i.e. Sixefcopolyimide ® (6FCOPI), produced by Hoechst Celanese Corporation, containing recurring units of the formula:

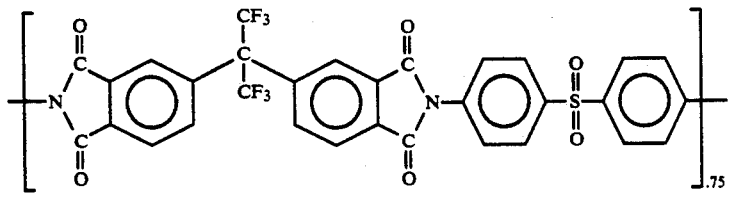

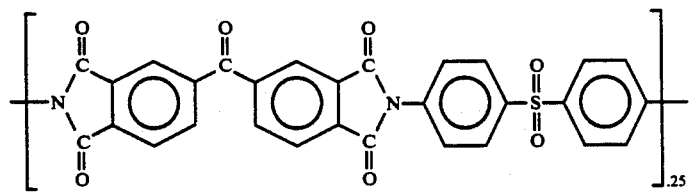

The aromatic polyetherimides (PEI) useful in the present invention generally contains recurring units of the formula:

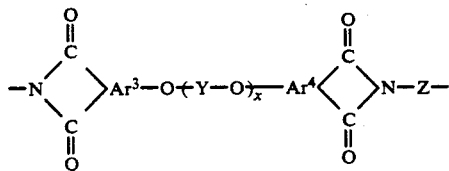

wherein $Ar^3$ and $Ar^4$ represent trivalent aromatic moieties or mixtures thereof; wherein Y represents divalent aromatic moieties or divalent aliphatic moieties containing up to 6 carbon atoms, or mixtures thereof; wherein Z represents aromatic moieties or divalent aliphatic moieties containing up to 6 carbon atoms, or mixtures thereof; and wherein x is the number of repeating units and may have a value of 0 or a positive integer.

A preferred polyetherimide is Ultem ® 1000, from General Electric Company, contain recurring units of the formula:

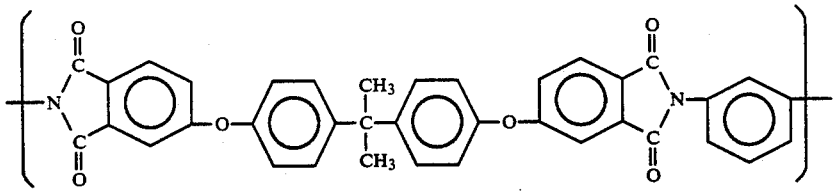

This PEI is soluble in methylene chloride, chloroform, N,N'-dimethylformamide and N,N',-dimethylacetamide.

Compositions of polybenzimidazoles and polyimides are disclosed in U.S. Pat. No. 4,973,629, and compositions of polybenzimidazole and polyetherimides are disclosed in U.S. Pat. No. 4,973,629, both of which are herein incorporated by reference in their entirety. Generally, the article may contain 100 weight percent of PBI, i.e., neat PBI, or an end-capped PBI. Typically, however, the article may contain about 50 weight percent of PBI or end-capped PBI, and about 50 weight percent of a polyimide (PI), i.e., Sixefpolyimide ™, based on the total weight of the article. In another embodiment of the invention, the article may contain about 85 weight percent of PBI and about 15 weight percent of polyetherimide (PEI), based on the total weight of the article.

The miscible polymer blends containing aromatic PBI and PEI or PI are generally prepared by solution blending. Known quantities of each component are dissolved in a mutually suitable solvent so that the resulting blend contains the desired weight percent of each polymer. Each polymer may be separately dissolved in an identical solvent and thereafter mixed together to form a solution, or both polymers may be mixed together in a mutually suitable solvent, e.g., N,N'-dimethylacetamide (DMAc), to form a homogeneous solution of the two polymers. It may be desirable to add a small amount of lithium chloride to improve the stability of the neat PBI solutions and prevent phase separation. Methods of forming polymer solutions in a variety of solvents are known to those skilled in the art. One suitable method for forming these solution, particularly for PBI, is by mixing the polymer at a temperature above the boiling point of the solvent, for example, from approximately 25° to approximately 100° C. above the boiling point with pressures of from approximately 2 to approximately 15 atmospheres for a period of from approximately 1 to approximately 5 hours. The amount of polymer solids in the polymeric solution generally ranges from about 15 to about 35 weight percent, and thus the amount of solvent ranges from about 65 to about 85 weight percent, based on the total weight of the solution. Typically, the amount of polymer solids will range from about 20 to about 30 weight percent, and preferably the amount of solids will be about 25 weight percent, based on the total weight of the polymer solution.

After formation of the polymeric solution, films, fibers and molded objects may be produced by conventional techniques known in the art. Films are produced from the polymeric solution by the process of solvent casting. Fibers are produced from the solution by the process of wet or dry spinning, and molded objects are generally produced from the solids by compression molding. For this, polymer particles (i.e., solids) may be precipitated from the solvent by adding the polymeric solution to a suitable nonsolvent. Generally, the nonsolvent is water or a $C_1$-$C_4$ alphatic alcohol, i.e., methanol or ethanol. The precipitated particles may be collected on a filter and washed to remove any residual solvent and dried under reduced pressure at moderate temperatures. Conventional fillers and reinforcement agents may be added to the particles prior to molding to enhance the strength of the shaped object.

One embodiment of the invention is directed to a process for preparing a polybenzimidazole-containing article having improved long term thermo-oxidative stability (TOS). The article of the invention may contain from about 5 to about 100 weight percent of polybenzimidazole and from about 0 to about 95 weight percent of a thermoplastic polymer, based upon the total weight of the article. The process steps are:
a) providing a phosphoric acid solution of from about 2.0 to about 10.0 weight percent of acid, based on the total weight of the solution;
b) contacting the article with the solution for sufficient time to produce an acid-treated article;
c) drying the acid-treated article under a reduced atmosphere at a temperature ranging from about 80° C. to about 140° C. to remove excess acid from the surface of the article; and
d) heat treating the dried article at a temperature ranging from about 400° C. to about 500° C. for at least about 1 minute in an inert atmosphere,
wherein the article retains about 50 percent of its weight after isothermal aging in air at about 600° F. for a period of at least about 300 hours. Typically, the article will retain about 60 percent of its original weight when exposed to isothermal aging in air at about 600° F. for at least about 450 hours.

The process of the invention requires the initial formation of a dilute phosphoric acid solution. Generally, the solution will contain from about 2.0 to about 10.0 weight percent of acid, typically, about 4.0 to about 8.0 weight percent of acid, and preferably about 5.0 weight percent of acid, based on the total weight of the solution. During a typical treatment process, the phosphoric acid solution should be maintained at a temperature of from approximately 40° to approximately 60° C., and preferably at approximately 50° C.

After formation of the acid solution, the PBI-containing article is contacted with the solution for a sufficient amount of time to produce an acid-treated blend. In the case of film and fibers, a general contact time of from about 1 minute to about 5 hours is sufficient to produce an acid-soaked article. However, when treating molded objects the contact time may range from about 2 to about 80 hours depending on the thickness and density of the object, and rate of absorption of the acid. The contacting step of the process is typically conducted by placing the acid solution in a large vat or other container, and fully immersing the article therein. When treating film or fiber it may be desirable to utilize a continuous process, however, when treating molded objects, wherein a greater contact time is required, it may be advantageous to utilize a batch process. The objective of treating a PBI-containing polymer blend with phosphoric acid is to provide a phosphate coating at least on the surface of the polymer article. Generally, an acid-treated, molded object fabricated from a PBI-containing polymer blend should be contacted with the acid solution for a sufficient amount of time to generate an acid coating which penetrates the surface of the object to a depth ranging from about 2 to about 10 μm.

Following the acid-treatment, the PBI-containing article is dried to remove any excess phosphoric acid remaining on the surface. The drying step of the process is generally conducted overnight at a low temperature, i.e., from about 50° to about 200° C. Typically, the article may be dried overnight at a temperature of about 80° C. and then dried at 140° C. under an inert atmosphere, i.e., nitrogen or argon, or reduced pressure (vacuum oven) for about 2 hours.

Upon completion of the drying step, the article is subjected to heat treatment to form a thermally resistant, oxidatively stable article. It is believed that the heat treating step of the process transforms the acid coating into a glassy-type barrier layer which enhances the thermal resistance and oxidative stability characteristics of the article. Typically, the heat treatment step of the process requires placing the article in an oven at a temperature ranging from about 400° to about 500° C. for a period of about 1 to about 2 minutes under an inert atmosphere, and preferably, at about 450° C. for about 1.5 minutes depending on the thickness of the article.

The long term thermo-oxidative stability (TOS) evaluation is performed by placing the article in an air atmosphere oven heated to a temperature of about 600° F. for a period of up to about 500 hours. During the evaluation, the article is removed at intervals and weighed to measure the percent weight retention and immediately placed back into the oven to continue the evaluation.

The following examples illustrate the process of preparing thermally resistant, oxidatively stable articles of the present invention. They are provided for purposes of exemplification only as should be appreciated from the foregoing discussion.

EXAMPLE 1

A PBI polymer solution (dope) was prepared by drying PBI polymer resin overnight at a temperature of 150° C. under a reduced atmosphere. The polymer resin was charged into a vessel containing DMAc under constant agitation while heating slowly to a temperature of about 235° C. and increasing the pressure to 65 psi; the final solution contained 25 weight percent of polymer solids. After cooling the PBI solution to a temperature of about 25° C., it exhibited a viscosity of about 2000 poise. The solution was filtered to remove impurities and any undissolved resin.

To prepare fibers, the solution was fed to a metering pump which introduced a precise volume of solution through a final candle filter to a spinneret. The spinneret was a 3-inch plate containing 100 holes or capillaries wherein each capillary was 100 microns in diameter. The solution was extruded through the spinneret holes into an electrically heated column using a down draft of nitrogen. The filaments were passed around a rotating godet roll at the bottom of the column and to a winder. To remove residue solvent from the filaments, the bobbins were washed in water overnight at 50° C. followed by forced air drying at 120° C. for about 2 hours. The fibers were treated with a 5 wt % phosphoric acid solution for 2 hours at 50° C. using a batch process, dried at 140° C. in a nitrogen atmosphere at reduced pressure for 2 hours, and subjected to heat setting at a temperature of 450° C. for 1.5 minutes. The fibers were weighed, placed in crucibles, and the crucibles were placed in an air atmosphere oven at 600° F. for long term isothermal, thermo-oxidative evaluation During the test, the crucibles containing the fibers removed from the oven at appropriate times, immediate y sealed for cooling and weighing, and placed back in the oven for further aging. FIG. 1 illustrates the weight percent retention of these fibers for comparison to untreated and acid treated fibers.

EXAMPLE 2

Figure 2:
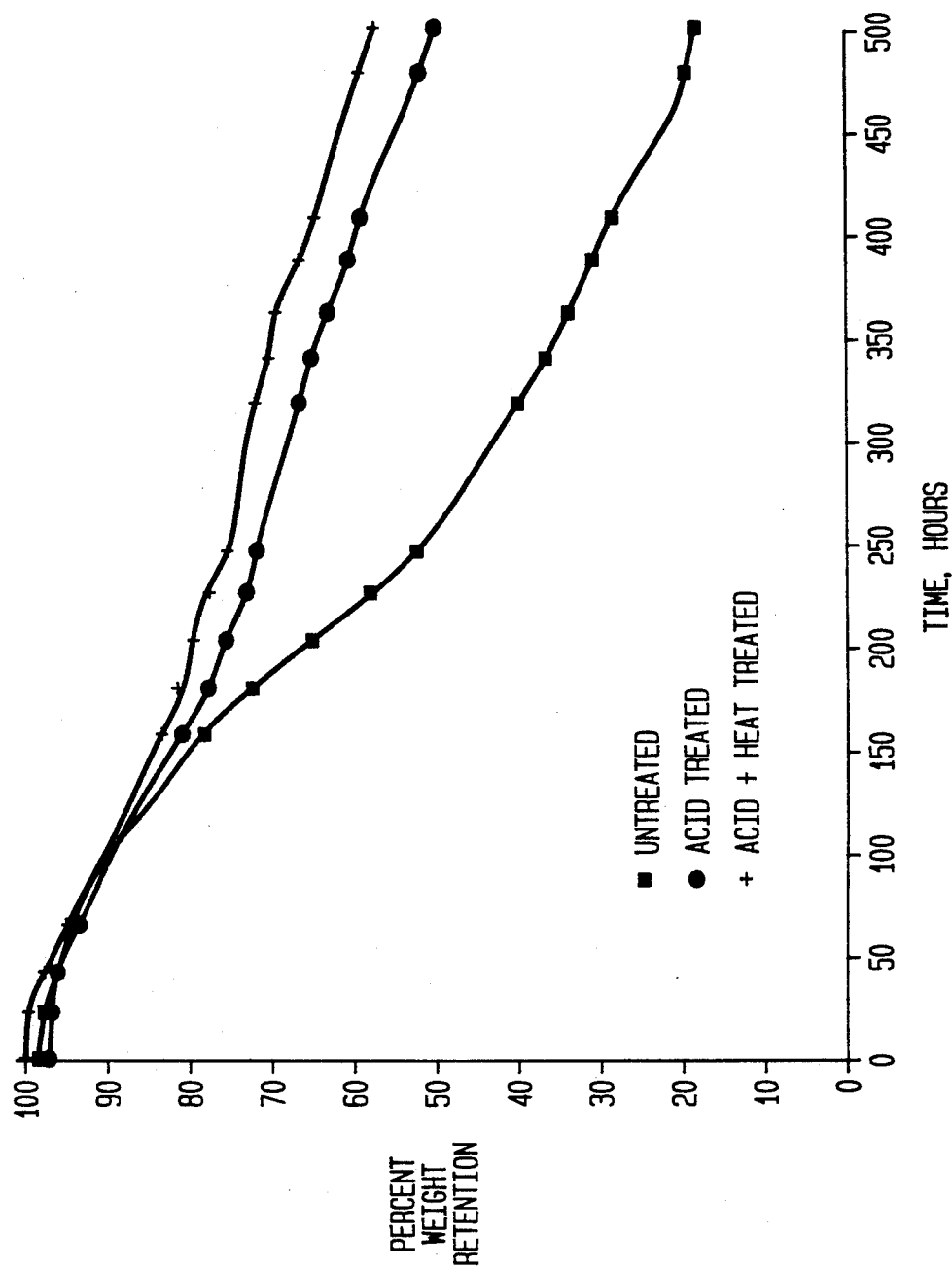
FIG. 2 is a plot of the thermo-oxidative stability at 600° F. of polybenzimidazole film treated according to the process of the invention.

An end-capped PBI dope, prepared according to the method of Example 1, was utilized to prepare end-capped PBI film. To prepare the film, the filtered dope was cast onto glass plates utilizing conventional techniques. After drying, the film was removed from plates by water submersion. The residual DMAc was removed overnight by methanol soxhlet extraction. Thereafter, the film was dried overnight at 120° C.; the film was clear in appearance and had a thickness of 3.0 mils. The film was treated with a 5 wt % phosphoric acid solution at a temperature of 50° C. for 2 hours, dried at 140° C. in a nitrogen atmosphere under reduced pressure, and subjected to heat treatment at a temperature of 450° C. under a nitrogen atmosphere for 1.5 minutes. Thereafter, the film was subjected to isothermal aging in an air atmosphere at 600° F. to determine its TOS. FIG. 2 illustrates the TOS evaluation for untreated, acid treated, and acid and heat treated end-capped PBI films.

EXAMPLE 3

A blend dope containing 85 weight percent PBI and 15 weight percent Ultem ® 1000 (PEI), was prepared for fabrication into film. Each polymer was dried at 150° C. under vacuum overnight; the resins were charged into separate preparation vessels and blanketed with inert gas by evacuation and refilling with nitrogen (oxygen had to be excluded to prevent gellation due to oxidative cross-linking of the resins), thereafter, the charged vessels were slowly heated and DMAc was added thereto while constantly stirring to form the solutions containing the requisite amount of resins. The PBI solution (25% PBI by weight) was prepared while heating the vessel to 235° C. and 65 psi, and the PEI solution (35% Ultem ® 1000 by weight) was prepared while heating the vessel to 100° C. In each case, the total heating cycles were about 5 hours. After cooling the PBI solution to about 100° C., appropriate amounts of PBI and PEI were mixed to prepare the 85/15 weight ratio PBI/PEI blend dope. The viscosity of the dope was about 2000 poise. Similarly, an 85 weight percent end-capped PBI and 15 weight percent Ultem ® 1000 blend dope was prepared for fabrication of film.

Figure 3:
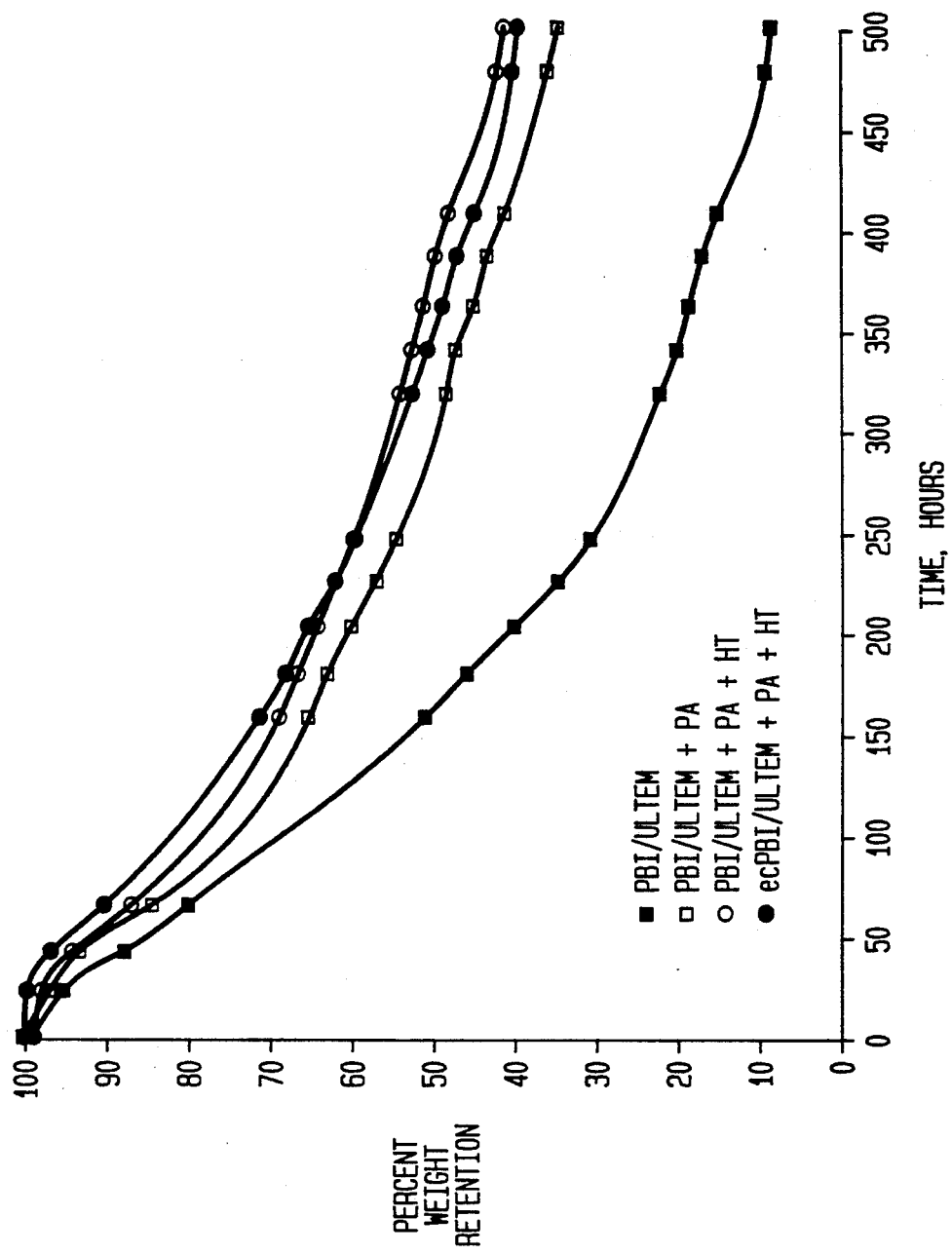
FIG. 3 is a plot of the thermo-oxidative stability at 600° F. of 85/15 weight ratio of polybenzimidazole/Ultem ® 1000 blend film treated according to the process of the invention.

To prepare the film, the procedure of Example 2 was utilized. FIG. 3 illustrates the TOS evaluation for untreated, acid treated, and acid and heat treated 85/15 weight ratio PBI/Ultem ® 1000 film, and acid and heat treated 85/15 weight ratio of end-capped PBI/Ultem ® 1000 film.

EXAMPLE 4

Figure 4:
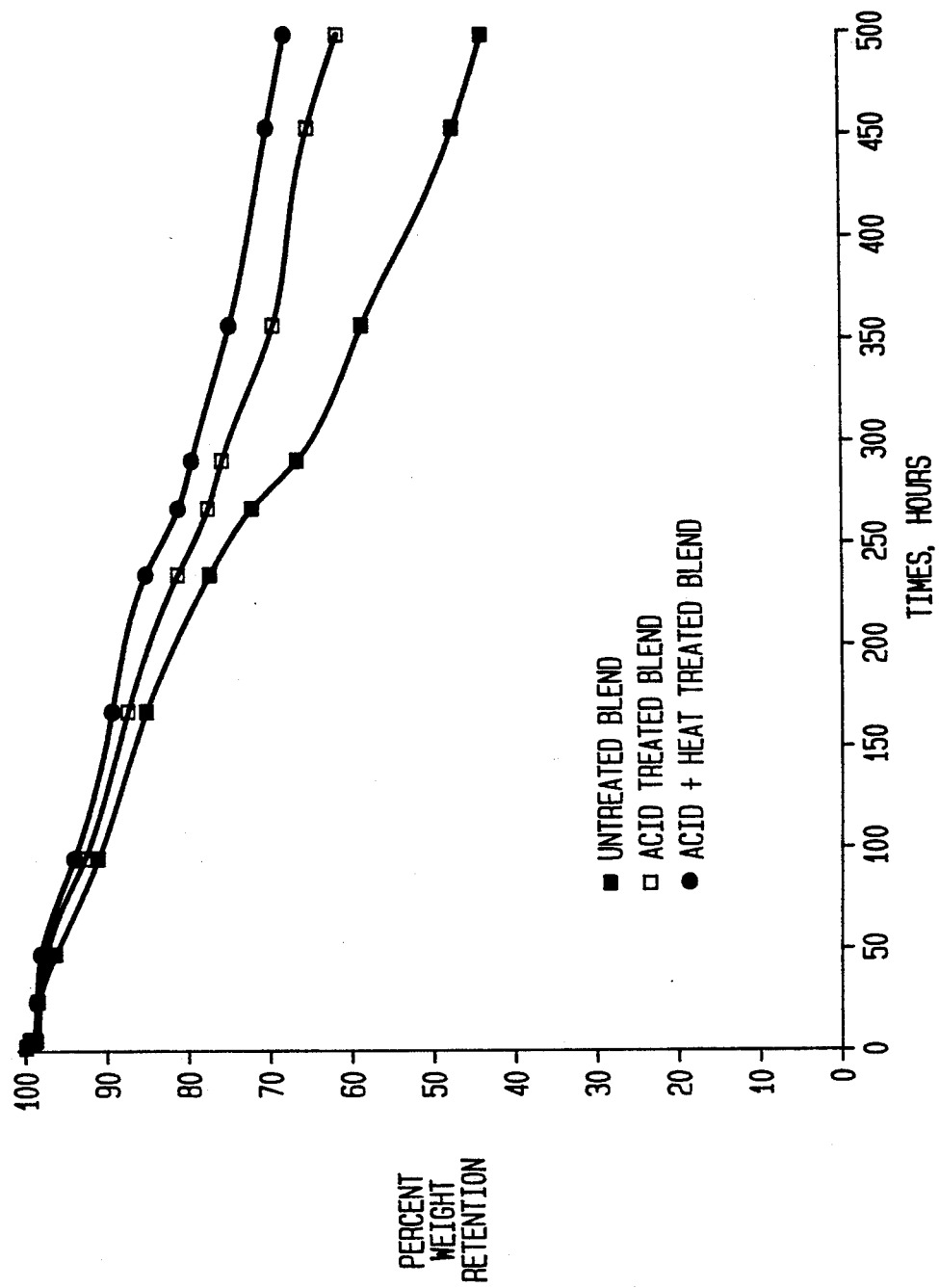
FIG. 4 is a plot of the thermo-oxidative stability at 600° F. of 50/50 weight ratio of polybenzimidazole/6-FCOPolyimide blend film treated according to the process of the invention.

A blend dope containing 50 weight percent of PBI and 50 weight percent of 6FCOPI, was prepared for fabrication into film. Individual dopes containing 25 weight percent of PBI and 35 weight percent of 6FCOPI in DMAc having viscosities ranging from 2200 to 2400 were prepared. After cooling, the dopes were mixed together to form the appropriate weight ratio of the blend. To prepare films, the filtered polymer solution was cast onto glass plates. After drying, the film sheets were removed from the glass plates by water submersion. The residual DMAc solvent was removed overnight by methanol soxhlet extraction. Thereafter, the films were dried overnight at 120° C. The films were clear and had a thickness of 3.0 mil. The films were treated with a 5 weight percent phosphoric acid solution at a temperature of 50° C. for 2 hours, dried at 140° C. in a nitrogen atmosphere under reduced pressure, and subjected to heat treatment at a temperature of 450° C. under a nitrogen atmosphere for 1.5 minutes. Thereafter, the films were subjected to isothermal aging in an air atmosphere at 600° F. to determine TOS. FIG. 4 illustrates the TOS evaluation for untreated film, acid treated film, and acid and heat treated film.

FIG. 1 illustrates the thermo-oxidative stability of neat PBI fiber. After isothermal aging in air at 600° F. for about 450 hours, untreated fiber displayed a weight retention of about 13 percent, acid treated fiber displayed a weight retention of about 64 percent, and acid and heat treated fiber displayed a weight retention of about 71 percent.

FIG. 2 illustrates the thermo-oxidative stability of neat end-capped PBI film. After isothermal aging in air at 600° F. for about 500 hours, untreated film displayed a weight retention of about 20 percent, acid treated film displayed a weight retention of about 50 percent, and acid and heat treated film displayed a weight retention of about 60 percent.

FIG. 3 illustrates the thermo-oxidative stability of an 85 weight percent PBI and 15 weight percent Ultem ® 1000 blend film. After isothermal aging in air at 600° F. for about 500 hours, untreated film displayed a weight retention of about 10 percent, acid treated film displayed a weight retention of about 35 percent, and acid and heat treated film displayed a weight retention of about 41 percent. The 85 weight percent end-capped PBI and 15 weight percent Ultem ® 1000 blend film displayed a weight retention of about 40 percent.

FIG. 4 illustrates the thermo-oxidative stability of a 50 weight percent PBI and 50 weight percent 6FCOPI blend film. After isothermal aging in air at 600° F. for about 500 hours, untreated film displayed a weight retention of about 40 percent, acid treated film displayed a weight retention of about 60 percent, and acid and heat treated film displayed a weight retention of about 70 percent.

We claim:

1. A process for preparing a thermally resistant, oxidatively stable polybenzimidazole-containing article consisting of about 85 weight percent of polybenzimidazole and about 15 weight percent of polyetherimide, comprising the steps of:
    a) providing a phosphoric acid solution of about 2.0 to about 10.0 weight percent of acid;
    b) contacting the polybenzimidazole-containing article with the acid solution for sufficient time to produce an acid-treated article;
    c) drying the acid-treated article at a low temperature to remove excess acid; and
    d) heat treating the dried article at a temperature from about 400° to about 500° C. in an inert atmosphere to form a phosphate barrier layer on the surface of the article wherein the article retains at least about 50 percent of its weight after isothermal aging at about 600° F. for a period of at least about 300 hours.

2. The process according to claim 1 wherein the contact time is at least about 1 minute.

3. The process according to claims 1 wherein the concentration of the phosphoric acid solution is about 5 weight percent.

4. The process according to claim 1 wherein the temperature of the phosphoric acid solution is about 50° C.

5. The process according to claim 1 wherein the heat treatment temperature is about 450° C.

6. The process according to claim 5 wherein the heat treatment time is about 1.5 minutes.

7. The process according to claim 1 wherein the article is selected from the group consisting of films, fibers and molded objects.

8. The process according to claim 1 wherein the polybenzimidazole is an end-capped polybenzimidazole is of the formula:

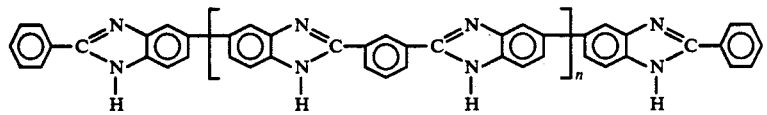

wherein n is an integer from about 18 to about 88.

9. An article produced by the process according to claim 1 which retains about 70 percent of its weight after isothermal aging at about 600° F. for at least about 500 hours.

10. A process for preparing a thermally resistant, oxidatively stable polybenzimidazole-containing article consisting of about 50 weight percent of polybenzimidazole and about 50 weight percent of polyimide, comprising the steps of:
   a) providing a phosphoric acid solution of about 2.0 to about 10.0 weight percent of acid;
   b) contacting the polybenzimidazole-containing article with the acid solution for sufficient time to produce an acid-treated article;
   c) drying the acid-treated article at a low temperature to remove excess acid; and
   d) heat treating the dried article at a temperature from about 400° to about 500° C. in an inert atmosphere to form a phosphate barrier layer on the surface of the article wherein the article retains at least about 50 percent of its weight after isothermal aging at about 600° F. for a period of at least about 300 hours.

11. The process according to claim 10 wherein the polybenzimidazole-containing polymer article is selected from the group consisting of films, fibers, and molded objects.

12. The process according to claim 8 wherein the concentration of the phosphoric acid solution is about 5.0 weight percent acid.

13. The process according to claim 8 wherein the contact time is at least about 1 minute.

14. The process according to claim 10 wherein the temperature of the phosphoric acid solution is about 50° C.

15. An article produced by the process according to claim 10 which retains about 40 percent of its weight after isothermal aging at about 600° F. for at least about 500 hours.

* * * * *